US005409346A

United States Patent [19]

Grether

[11] Patent Number: 5,409,346

[45] Date of Patent: Apr. 25, 1995

[54] SELF-LOADING AND UNLOADING FORKLIFT TRUCK

[76] Inventor: Martin Grether, 2302-137th Pl., SE., Bothell, Wash. 98012

[21] Appl. No.: 73,583

[22] Filed: Jun. 7, 1993

Related U.S. Application Data

[63] Continuation-in-part of Ser. No. 785,631, Oct. 31, 1991, Pat. No. 5,217,342.

[51] Int. Cl.[6] .................... B60P 1/64

[52] U.S. Cl. .................... 414/631; 180/282; 414/673; 414/914; 414/399; 414/392; 414/347; 414/635; 212/157; 187/222; 187/224

[58] Field of Search ............... 414/467, 630, 631, 632, 414/914, 633, 634, 390, 391, 392, 635, 636, 542, 543, 399, 629, 673, 641, 642, 663, 664, 665, 666, 667, 668, 343, 346, 340, 345, 347, 349; 187/9 R, 9 E; 180/906, 8.5, 8.6, 9.34, 9.5, 209, 240.1, 326, 282–285; 280/405.1, 407; 212/149, 153, 154, 157

[56] References Cited

U.S. PATENT DOCUMENTS

| | | | |
|---|---|---|---|
| 2,751,994 | 6/1956 | Remde | 180/282 |
| 3,792,748 | 2/1974 | Regier | 180/282 |
| 4,145,682 | 3/1979 | Cook | 180/282 X |
| 4,172,688 | 10/1979 | Cecchi et al. | 212/157 X |
| 4,261,616 | 4/1981 | Beegle | 180/282 X |
| 4,359,137 | 11/1982 | Merz et al. | 212/151 X |
| 4,460,064 | 7/1984 | Lutz et al. | 280/43.23 X |
| 4,682,145 | 7/1987 | Brawner, Jr. | 180/282 X |
| 4,708,577 | 11/1987 | Frazke | 414/673 X |
| 4,895,262 | 1/1990 | Maso | 212/154 |

FOREIGN PATENT DOCUMENTS

| | | | |
|---|---|---|---|
| 734052 | 5/1980 | U.S.S.R. | 180/282 |

*Primary Examiner*—Frank E. Werner

[57] ABSTRACT

The chassis of a forklift truck includes a front assembly and a rear assembly which, in certain embodiments, are movable toward and away from each other between an extended stable normal working condition and a contracted compact condition for storage or transport of the forklift truck. The front assembly includes driven front wheels, standard upright mast and double-acting lift jack for the fork carriage movable along the mast. The rear assembly includes the operator compartment, rear axle assembly for the rear wheels and mechanism mounting the rear axle assembly for vertical movement relative to the operator compartment between a raised normal working position and a downward-projected position. The rear assembly also includes a landing wheel or wheels mounted in front of the rear axle assembly at a location above the rear wheels when the rear axle assembly is raised. The rear assembly also includes a stabilizing system which corrects tipping of the rear assembly when the rear axle assembly is in the downward-projected position. Projection and retraction of the rear axle assembly in cooperation with movement of the front and rear assemblies toward and away from each other and movement of the fork carriage along the mast permits self-loading and unloading of the forklift truck from one horizontal surface to another, with or without a load, such as onto and off of the bed of a transport vehicle.

4 Claims, 6 Drawing Sheets

Fig.1.
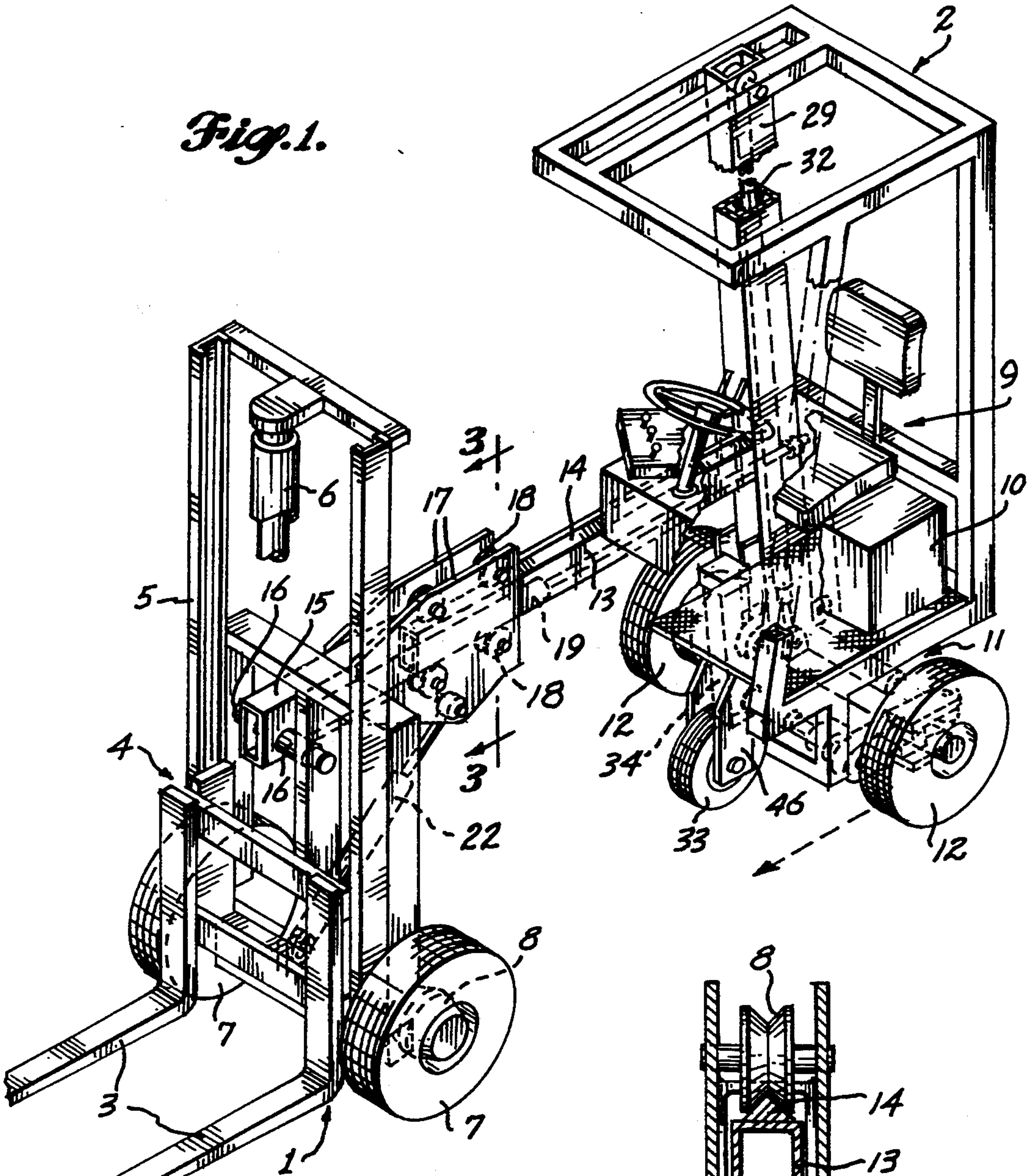
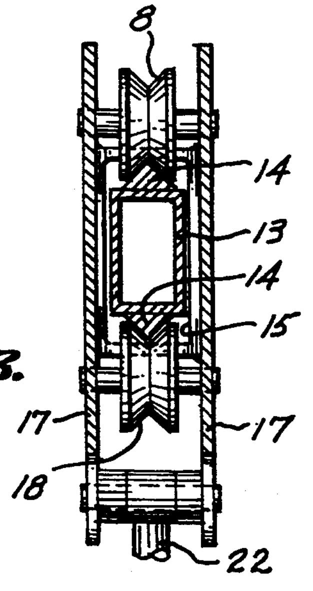
Fig.3.

Fig. 4.
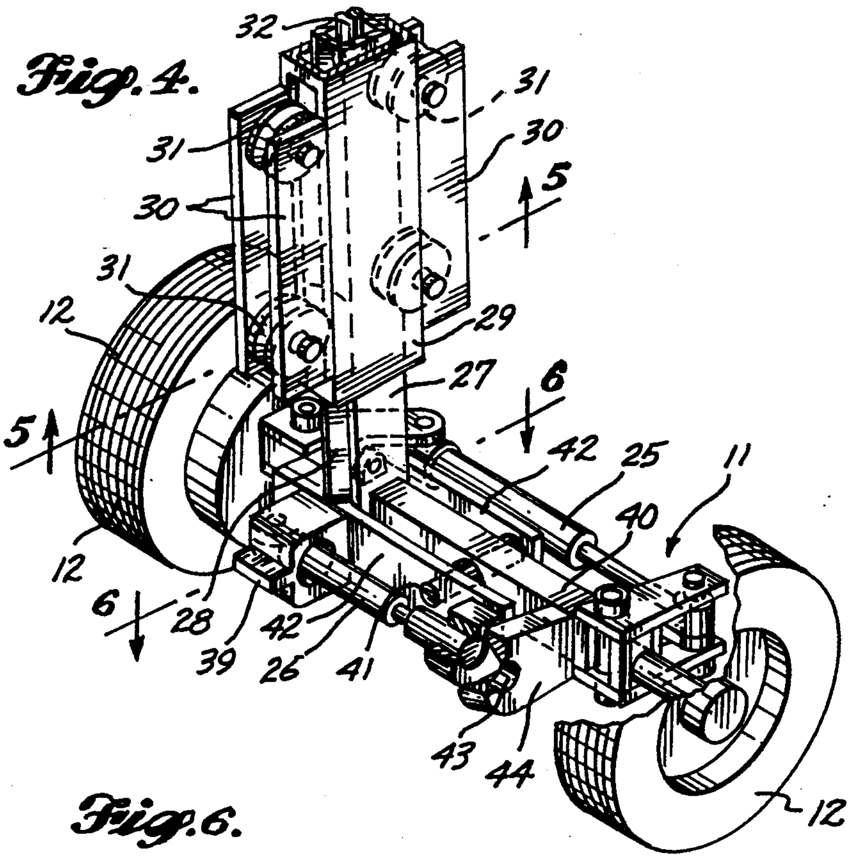
Fig. 6.
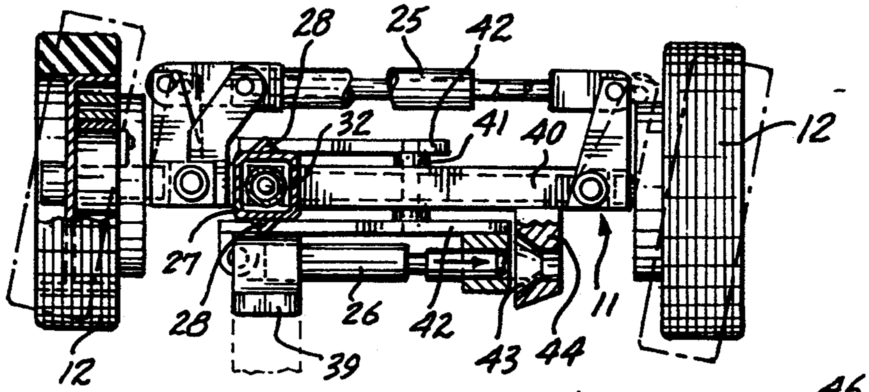
Fig. 5.
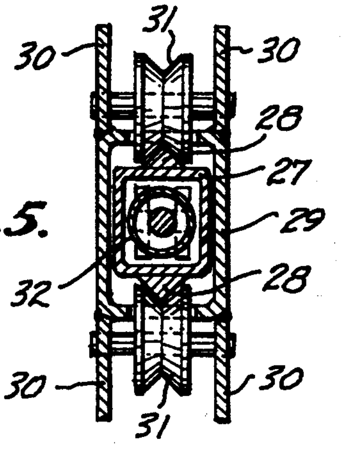
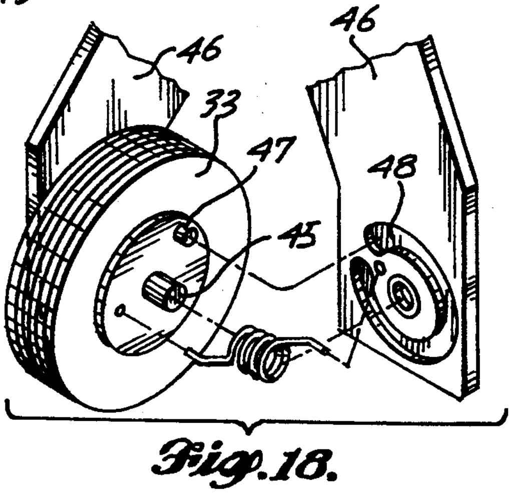
Fig. 18.

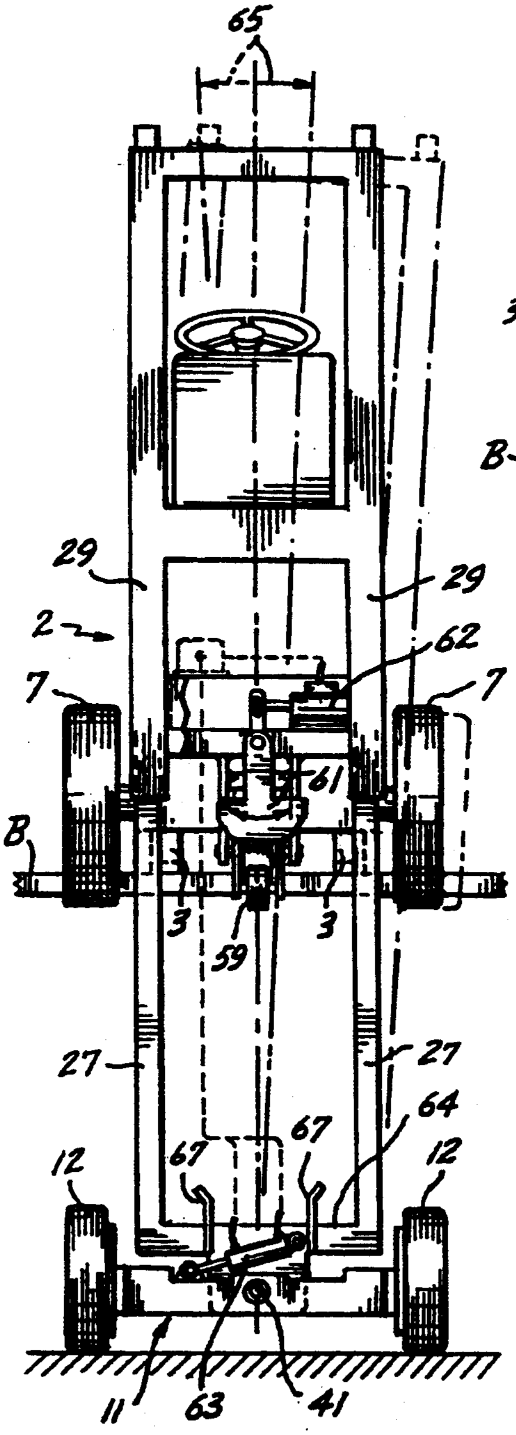
Fig. 19.
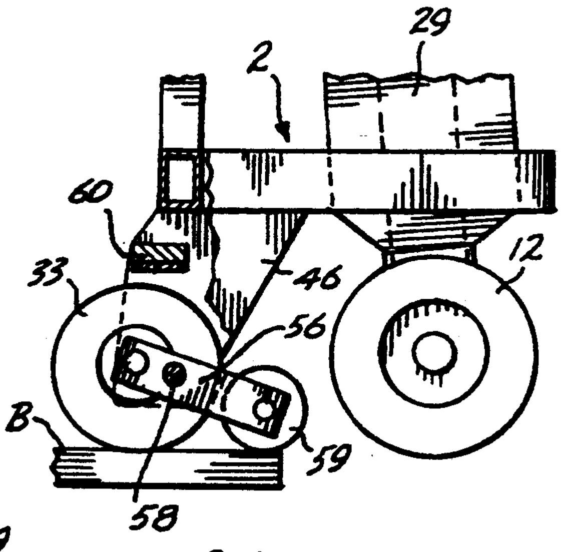
Fig. 21.
Fig. 22.
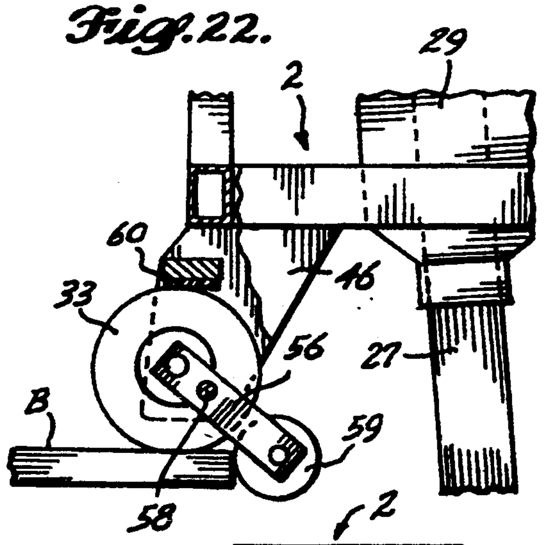
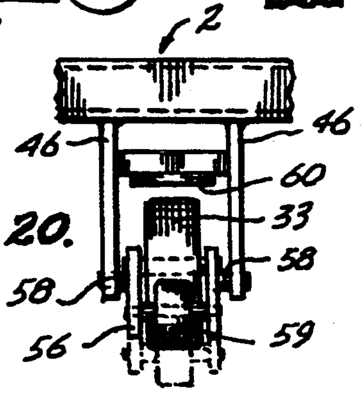
Fig. 20.

SELF-LOADING AND UNLOADING FORKLIFT TRUCK

REFERENCE TO RELATED APPLICATION

This application is a continuation-in-part of U.S. patent application Ser. No. 07/785,631 which was filed on Oct. 31, 1991, titled "Self-Loading and Unloading Forklift Truck" and now U.S. Pat. No. 5,217,342 issued on Jun. 8, 1993. Said copending application is expressly incorporated by reference herein.

FIELD OF THE INVENTION

The present invention relates to the general field of material or article handling. More specifically, the present invention pertains to a forklift truck which, by its own action, can step between horizontal surfaces at substantially different levels, such as onto and off of the bed of a larger truck or trailer.

BACKGROUND OF THE INVENTION

In the absence of a loading dock, loading and unloading large transport vehicles presents a substantial problem for a standard forklift truck because of the limited reach of such a truck. Even if the reach is sufficient to unload the vehicle, there can be a problem in transporting the forklift truck along with the load because standard forklift trucks are bulky and heavy and do not tow well.

Lutz et al., U.S. Pat. No. 4,460,064, issued Jul. 17, 1984, discloses a forklift truck having sets of wheels at the front, center, and rear. During normal use, the truck is supported on the center and front sets of wheels, but when it is desired to load the truck to a higher surface, the forks are lowered onto such surface, the front wheels are retracted and supports for the rear wheels are telescoped downward to raise the body of the truck as the forks are lowered relative to the body.

Steiger et al., U.S. Pat. No. 4,180,363, discloses a specialized track and carriage for the bed of a transport vehicle and a cooperating attachment for a forklift to assist loading a forklift truck onto and off of the bed.

Netherlands Patent No. 8005192, dated Sep. 17, 1980, discloses a forklift truck having a chassis collapsible to compact condition for transport. The chassis is extendible to a more stable work position. However, this patent is not concerned with loading and unloading of a forklift truck between different levels.

SUMMARY OF THE INVENTION

The present invention provides a forklift truck having a front assembly including driven front wheels and a substantially standard upright mast with a double-acting lift jack for the fork carriage, and a rear assembly including rear wheels which can be braked but are not driven and a substantially conventional operator compartment or cab with the usual hydraulic pump and pump-driving motor or engine. The rear assembly also has a central landing wheel or wheels close beneath the cab, slightly in front of the rear wheels. The front assembly and rear assembly are movable toward and away from each other so that the composite chassis of the forklift truck can be collapsed for storage or transport and be extended for stability during normal operation for material handling. In addition, the rear axle assembly supporting the rear wheels can be projected downward and subsequently retracted back upward relative to the operator compartment and the remainder of the chassis, and can also be equipped with a compensatory stabilization system which will correct lateral displacement or tipping of the forklift truck. Such projection and retraction of the rear axle assembly in cooperation with movement of the front and rear assemblies relatively toward and away from each other permits self-loading and unloading of the forklift truck from one horizontal surface to another, such as onto and off of the bed of a transport vehicle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a somewhat diagrammatic top perspective of a self-loading and unloading forklift truck in accordance with the present invention with, parts broken away; FIG. 3 (on the drawing sheet with FIG. 1) is a vertical section along line 3—3 of FIG. 1;

FIG. 4 is a top perspective of the rear axle assembly of the forklift truck of FIGS. 1 and 2 with parts broken away; FIG. 5 is a horizontal section along line 5—5 of FIG. 4; and FIG. 6 is a horizontal section along line 6—6 of FIG. 4;

FIG. 18 (on the drawing sheet with FIGS. 4, 5, and 6) is an enlarged fragmentary top perspective of another component of such truck with parts shown in exploded relationship;

FIG. 19 is a somewhat diagrammatic rear view of a forklift truck in accordance with the present invention, modified by inclusion of a compensatory stabilization system and an alternative landing wheel system, with parts broken away; and FIG. 20 is an enlarged detail end elevation of the alternative landing wheel system shown in FIG. 19, and FIG. 21 and FIG. 22 are corresponding fragmentary enlarged side elevations showing the alternative landing wheel system, with parts broken away and parts in different positions.

DETAILED DESCRIPTION OF THE PREFERRED EMBODIMENT

Figure 2:
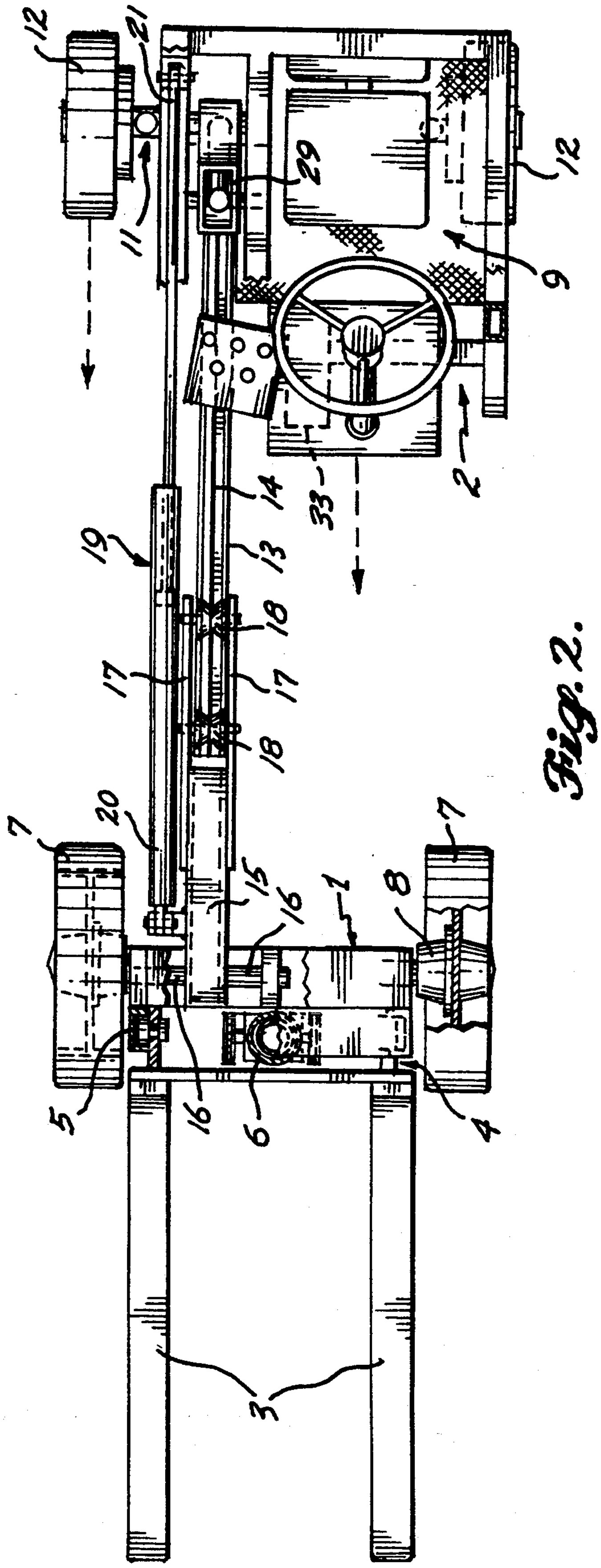
FIG. 2 is a top plan thereof with parts broken away.

With reference to FIG. 1 and FIG. 2, the forklift truck in accordance with the present invention consists of a front assembly 1 and rear assembly 2 each of which has many components of conventional design. The forks 3 of the front assembly extend forward from a standard fork carriage 4 movable along an upright mast assembly 5 by the action of a hydraulic lift jack 6 through a conventional system of chains and rollers (not shown). Jack 6 is double-acting so that the fork carriage is power driven both up and down. The front wheels 7 are driven by hydraulic wheel motors 8.

The rear assembly includes the operator's compartment or cab 9, and hydraulic pump and pump-driving motor or engine which are collectively represented as box 10 in FIG. 1. The pump drives all of the hydraulically-powered components as determined by standard controls accessible to the operator. A steering rear axle assembly 11 carries the rear wheels 12 which can be braked but are not driven.

In accordance with the present invention, the front assembly 1 and rear assembly 2 of the forklift truck chassis are movable toward and away from each other between a collapsed condition for storage or transport and an extended condition for stability during normal operation for material handling. A longitudinally extending horizontal beam 13 is cantilevered from the frame of the rear assembly 2. As best seen in FIG. 3, such beam has top and bottom triangular rails 14. The forward end portion of a larger box beam 15 is pivoted to the central portion of the mast assembly 5 by oppositely projecting stub shafts 16 best seen in FIG. 1. Upright roller support plates 17 are secured on opposite sides of the outer beam 15 and carry rollers 18 which ride on the rails 14, or another suitable antifriction interconnection could be used. If desired, a second longitudinally extending horizontal beam may be cantilevered from the frame of the rear assembly at the opposite side, parallel to and at the same height as the first longitudinally extending horizontal beam 13. The forward end portion of the second box beam would be identically pivoted to the central portion of the mast assembly 5 for increased stability.

From the condition shown in FIG. 2, the front box beam 15 can be telescoped rearward over the inner beam 13 by the action of a horizontal jack 19 which has its butt portion 20 connected to outer beam 15 of the front assembly 1 and its plunger 21 connected to the operator compartment frame of the rear assembly 2. The operator controls in the cab 9 include controls for the double-acting jack 19 to effect contraction or extension of the forklift truck chassis.

Similarly, a tilt jack 22 is connected between the lower portion of the mast assembly 5 and the lower portions of roller support plates 17 to adjust the angle of inclination of the mast assembly by swinging it about the stub shafts 16.

In addition to longitudinal extension and contraction of the chassis, the rear axle assembly 11 carrying the rear wheels 12 can be projected downward from the normal operating position shown in FIG. 1. The support mechanism for the rear axle assembly is similar to the interconnection of the front and rear assemblies of the lift truck. As illustrated in FIGS. 4, 5, and 6, such rear axle assembly 11, including the standard hydraulic steering jack 25 and the stabilizing jack 26 in accordance with the present invention, is carried at the bottom end portion of a hollow upright inner supporting column 27. Column 27 has front and rear triangular rails 28. An upright outer column 29 is fixed on the rear assembly, preferably at a small acute angle to vertical so that column 29 extends down and to the rear. Such outer column is telescoped over the inner hollow column 27 and has roller support plates 30. Rollers 31 supported on the plates 30 embrace and ride on the rails 28. In the illustrated embodiment only a single assembly of columns 27 and 29 is used, offset toward one side of the lift truck. However, two parallel assemblies can be provided at the opposite sides of the forklift truck as illustrated in FIG. 19.

Returning to FIGS. 4, 5, and 6, an axle lift jack 32 extends inside the inner column 27 and is connected between the rear axle assembly 11 and the upper portion of the chassis frame (as shown in FIG. 1) such that extension of the plunger of jack 32 has the effect of projecting the entire rear axle assembly downward and rearward from the operator compartment or cab. Retraction of the plunger of jack 32 has the effect of raising the rear axle assembly back up toward the cab.

In addition to the cab, hydraulic power drive components and rear axle assembly for the rear wheels 12, the rear assembly 2 of the forklift truck includes a central landing wheel 33 and adjacent landing stop mechanism 34 shown in FIG. 1. Wheel 33 is mounted at a fixed position relative to the cab a short distance in front of the rear wheels 12. Also, the landing wheel is positioned a short distance above the surface supporting the lift truck when the rear axle assembly is in its normal operating position close beneath the cab with the rear end portion of the truck supported by the rear wheels 12.

Figure 7:
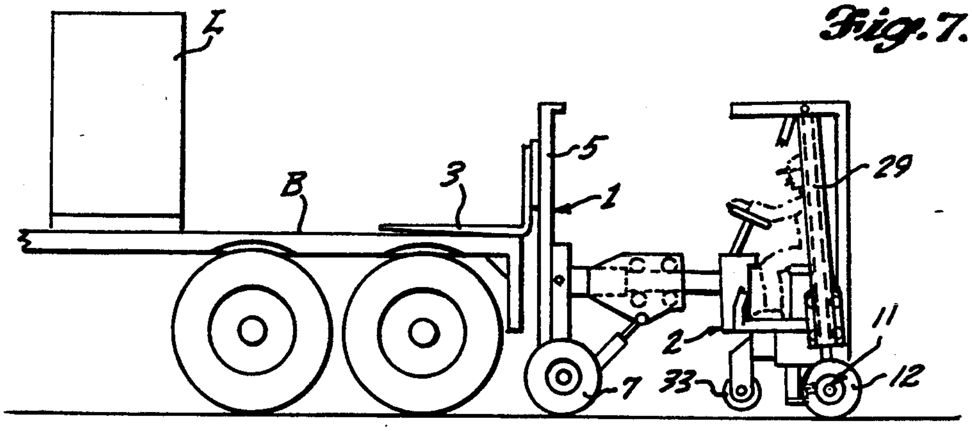
FIG. 7 is a diagrammatic side elevation of a self-loading and unloading forklift truck in accordance with the present invention adjacent to a transport vehicle on which it is desired for the forklift truck to be loaded.

Operation of the forklift truck in accordance with the present invention for stepping between horizontal surfaces at substantially different levels is illustrated in FIGS. 7 through 16. The normal material-handling condition of the forklift truck is with the chassis extended and rear axle assembly almost fully retracted as illustrated in FIG. 7. In such condition, the forks 3 are raised to clear the upper horizontal surface on which it is desired to load the forklift truck, in this case the bed B of a transport vehicle such as a larger truck or trailer. The forks 3 are lowered onto the bed with the mast assembly 5 closely adjacent to but spaced slightly off of the bed.

Figure 8:
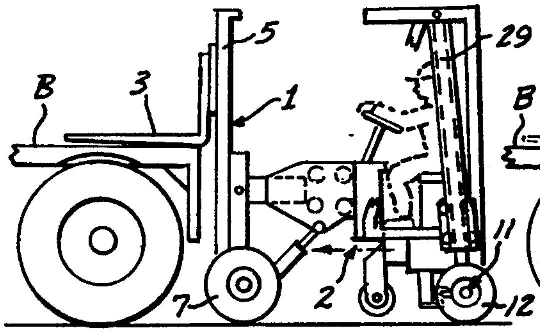
FIGS. 8 through 16 are corresponding diagrammatic side elevations with parts in different positions illustrating loading and unloading of such forklift truck.

Next, as illustrated in FIG. 8, the front assembly 1 and rear assembly 2 of the forklift truck are brought together so that the chassis is at least partially collapsed. The forks 3 are lowered as the rear axle assembly 11 is projected, thereby raising the body of the forklift truck to the solid line position illustrated in FIG. 9 where the front wheels 7 are at the same height as or slightly above the bed B.

Figure 17:
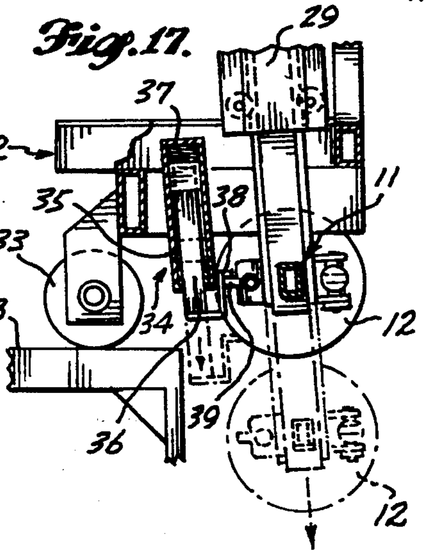
FIG. 17 is a fragmentary enlarged side elevation of a component of the forklift truck in accordance with the present invention with parts broken away.

Downward projection of the rear axle assembly 11 has the effect of automatically extending the landing stop mechanism 34. As best seen in FIG. 17, such stop mechanism includes an upright cylindrical housing 35 mounted on the chassis frame between the rear axle assembly 11 and the landing wheel 33. A landing stop piston 36 is received in the housing and is biased downward by an internal compression spring 37. Piston 36 has a rearward-projecting finger 38 which is supported on a catch flange 39 projecting forward from the rear axle assembly. When the rear axle assembly is in its raised position, the catch flange 39 maintains the landing stop piston 36 in its housing 35 against the force of the compression spring 37. When the axle assembly is projected downward, however, the landing stop piston moves downward to the broken line position shown in FIG. 17 which corresponds to the solid line position shown in FIGS. 9 and 10.

Figure 9:
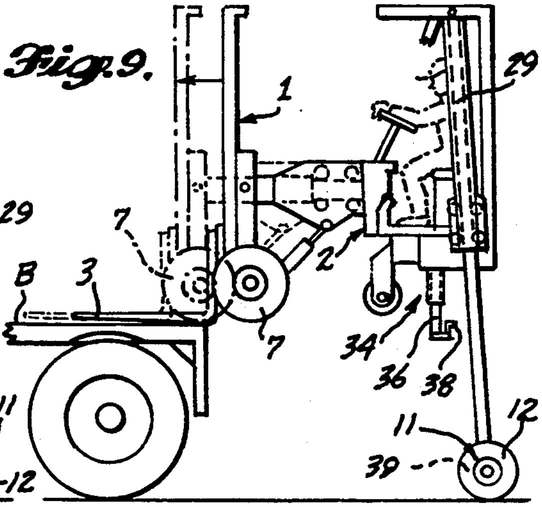

The next step in loading the lift truck is to extend the front and rear assemblies 1 and 2 with the rear wheels 12 securely braked, which has the effect of moving the front assembly from the solid line position to the broken line position illustrated in FIG. 9. The front wheels 7 then are positioned over the bed B. The forks are lifted slightly such that the forklift truck can be driven forward by the front wheels with the brakes of the rear wheels 12 released.

Figure 10:
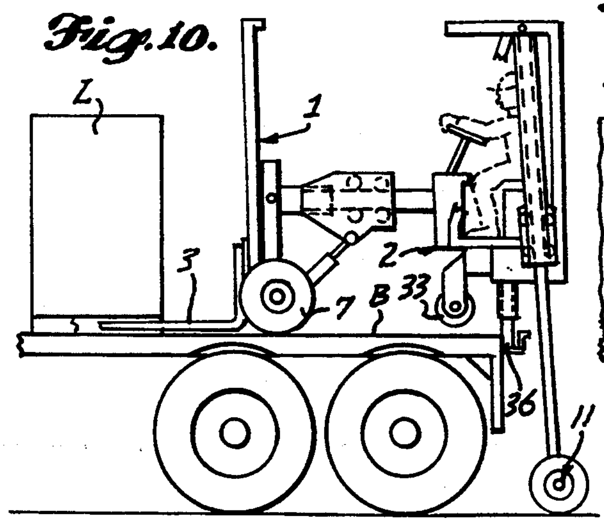
Figure 11:
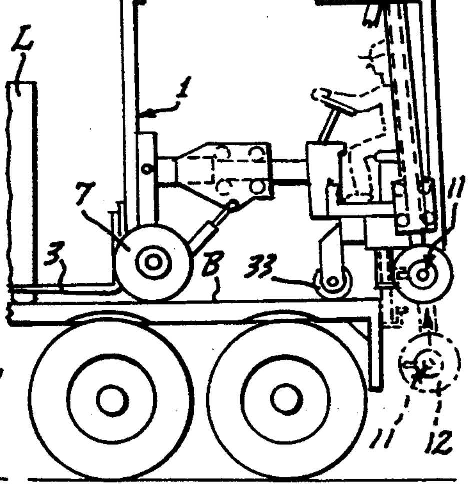

Forward movement of the forklift truck is continued until the projected landing stop piston 36 engages against the truck bed as illustrated in FIG. 10. The rear axle assembly 11 then is raised as illustrated in FIG. 11 such that the rear end of the forklift truck is supported on the landing wheel 33. As the rear axle assembly reaches its uppermost position, the catch flange engages the finger of the landing stop piston 36 and the piston is raised above the bed B on which the landing wheel 33 rests.

Figure 12:
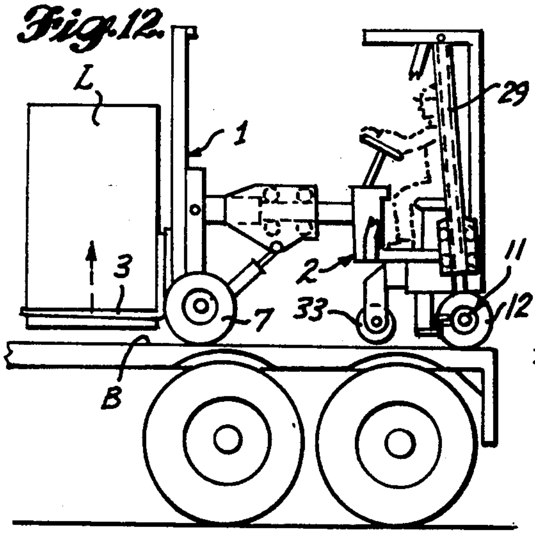

The rear wheels 12 can be raised to a height above the landing wheel 33 so that the lift truck can be driven smoothly forward until the rear wheels are positioned over the bed, whereupon the rear axle assembly can be lowered to the normal operating position illustrated in FIG. 12 in which the landing wheel is raised from the bed. A load L can be manipulated as desired on the bed.

Figure 13:
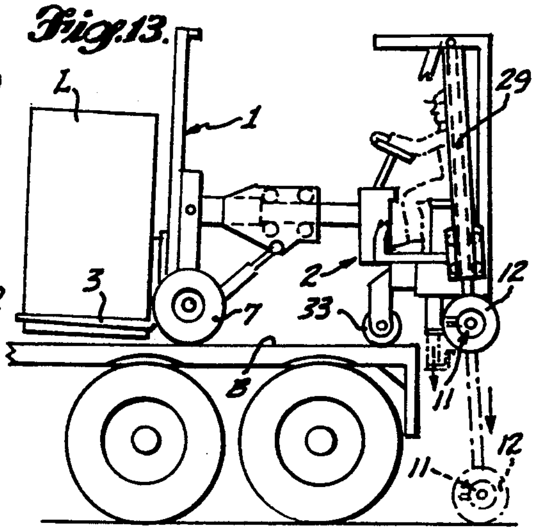

When it is desired to unload the forklift truck, it is driven rearward until the rear wheel rolls off the bed and the rear of the truck is again supported on the landing wheel 33. The rear axle assembly 11 is projected downward, as illustrated in FIG. 13. Since the outer column 29 in which the support member for the rear axle assembly rides is inclined, the axle assembly and rear wheels are projected downward and rearward, assuming that the wheels will clear the rear end of the bed.

Figure 14:
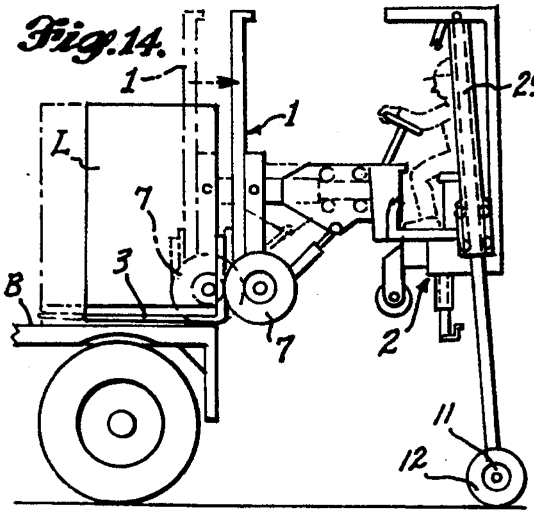
Figure 15:
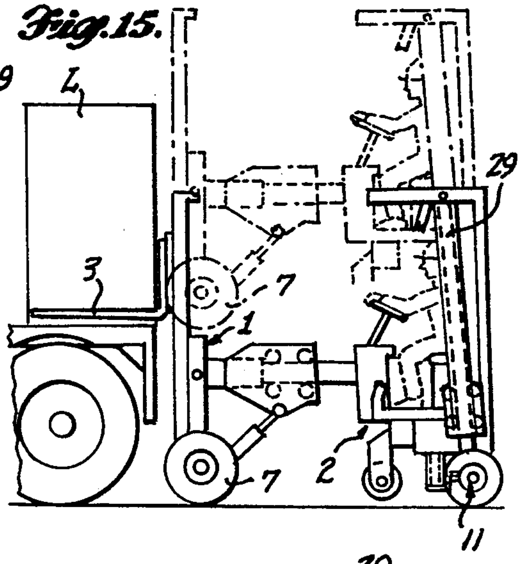
Figure 16:
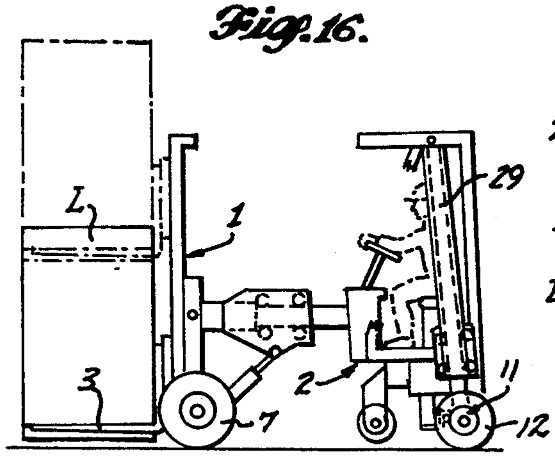

When the rear wheels 12 engage the ground, the lift truck can be driven rearward to a position in which the front wheels 7 are barely supported on the bed. With reference to FIG. 14, the rear wheels are braked and the chassis is contracted, i.e., the front assembly 1 is moved rearward from the broken line position to the solid line position so that the front end of the forklift truck is supported by the forks 3 resting on the bed. Finally, the forks are raised while the rear axle assembly is retracted relative to the remainder of the chassis, as illustrated in FIG. 15, and the load L can be manipulated conventionally, as illustrated in FIG. 16.

With reference to FIGS. 4 and 6, the rear axle assembly 11 has a transverse support bar 40 pivoted on a short shaft 41 which, in turn, is supported from the inner column 27 by bracket plates 42. This connection of the support bar 40 which carries the rear wheels 12 allows the bar to tilt relative to the front wheels so that all four wheels remain firmly on the ground during normal material handling operation of the forklift truck. However, the truck is raised high above the ground by projection of the rear axle assembly in combination with lowering of the forks, such as to the position illustrated in FIG. 9, it is desirable that the rear axle assembly be maintained in substantially fixed position relative to the chassis. As illustrated in FIG. 4 and FIG. 6, in accordance with the present invention a horizontal stabilizer jack 26 is mounted on the front bracket plate 42 with the jack plunger aligned with a recess 43 in a locking flange 44 fixed on the transverse support bar 40. When it is desired to project the rear axle assembly, the plunger of the stabilizer jack is extended into the locking flange such that tilting movement of the transverse support bar 40 relative to the supporting columns 27 and 29 is restrained.

During unloading of the forklift truck (FIGS. 12 through 16) it is, of course, highly desirable that rearward travel of the truck be stopped before the landing wheel rolls off the bed. The landing wheel can be provided with a one-way clutch or bearing permitting the wheel to roll forward during loading of the truck (FIG. 11 ) but preventing substantial rearward rolling of the wheel when the truck is being unloaded. FIG. 18 (on the drawing sheet with FIGS. 4, 5 and 6) illustrates a representative construction allowing the wheel to roll only a short distance rearward from a "central" position to which it is biased, while permitting the landing wheel to roll forward a greater distance. In such construction, wheel 33 is carried by an axle 45 journaled in upright support plates 46 at opposite sides of the wheel. One or both sides of the wheel hub have a lateral projection 47 offset from the axle. Each projection 47 is received in a circular groove 48 formed in the inner surface of the support plate 46.

A torsion spring 49 biases the landing wheel 33 to its central position in which the lateral projection or projections 47 are disposed vertically above the axle 45. In such position groove 48 extends rearward (counterclockwise as viewed in FIG. 18) only a short distance which corresponds to the maximum rearward travel which it is desired to permit for the landing wheel. Groove 48 extends clockwise (as viewed in FIG. 18) from the lateral projection through a much larger angle such that more forward travel of the landing wheel is permitted which is desired during loading of the lift truck. If the landing wheel is 12 inches in diameter, for example, rearward travel of only about 4 inches to 6 inches can be permitted before the lateral projection engages the upper end of groove 48, whereas forward travel of more than two feet can be permitted before the lateral projection engages the other end of the groove.

Alternatively, the landing wheel system can be provided with a brake roll-back feature, as illustrated in FIGS. 19–22. In that case, the central landing wheel 33 is rotatably carried between the forward end portions of generally horizontal wheel support plates 56. Such plates are, in turn, pivotably mounted on stub shafts 58 extending to vertical support plates 46 depending from the lift truck frame. A smaller position sensing wheel 59 is rotatably carried between the rear end portions of the wheel support plates 56. When the forklift truck is in approximately the position illustrated in FIG. 13 rolling rearward off the bed of the larger vehicle, i.e., after the rear wheel 12 has passed the back end of the bed B, the rear of the forklift truck is supported on both wheel 33 and wheel 59. Further rearward movement of the lift truck causes wheel 59 to roll over the rear edge of the bed, such that the rear portion of the lift truck is supported only on wheel 33, thereby causing the wheel support plates 56 to rotate clockwise as viewed in FIGS. 21 and 22. Brake mechanism is provided to automatically prevent additional rearward movement of the lift truck. In the embodiment illustrated in FIGS. 19–22, a horizontal brake pad 60 is mounted above wheel 33 at a location to engage the top of the wheel when the position sensing wheel 59 has rolled over the rear edge of the bed B, thereby indicating to the operator that it is time to extend the rear axle assembly carrying the rear wheels 12.

Similarly, when the forklift truck is being loaded onto the vehicle bed B, landing wheel 33 initially is spaced above the bed (see FIG. 10), but will automatically be moved to the unbraked condition shown in FIG. 21 when the rear axle assembly is projected because the position sensing wheel 59 will engage the bed B.

As an alternative to the rear axle assembly locking system shown in FIGS. 4 and 6 which includes the stabilizing jack 26 for locking the position of the rear axle assembly 11 relative to the retractable inner column 27, the embodiment illustrated in FIG. 19 includes a pendulum actuated stabilization system. A free swinging pendulum 61 is pivotally mounted on the forklift truck rear assembly 2 and is interconnected with a position sensing control valve 62. Normally, when the upright frame of the rear assembly 2 extends substantially vertically, the rear axle assembly 11 is free to rotate about the longitudinal extending shaft 41 such that the axle assembly 11 will pivot to accommodate uneven terrain. However, when the axle assembly is projected, the stability of the forklift truck may be jeopardized, such as if the upper portion of the forklift truck tilts to such a degree that the center of gravity is shifted outside the triangle defined by the front wheels 7 (or the forks 3 if the front portion of the lift truck is supported by the forks) and the pivot 41. It is desirable to lock the rear axle assembly 11 relative to the remainder of the rear assembly before the forklift truck becomes unstable.

For that purpose, a double-acting stabilization jack 63 is interconnected between the axle assembly 11 and a cross bar 64 connecting the bottoms of the extendible columns 27. If the upper portion of the forklift truck tilts beyond a predetermined angle, represented by the arrows 65, the position-sensing valve 62 detects swinging of the pendulum 61 and, through a control system including a source of fluid under pressure, actuates the stabilizing jack as required to shift the forklift truck into a more vertical position. Stability of the forklift truck will no longer depend on the center of gravity lying within the triangle defined by the front wheels 7 (or forks 3) and the rear pivot 41, but rather on the center of gravity of the forklift truck overlying the rectangle defined by the front wheels 7 (or forks 3) and the rear wheels 12.

Stability of the forklift truck is of concern primarily when the center of gravity is high above the ground, i.e., when the rear axle assembly is projected. When the axle assembly is retracted, preferably the pendulum is held stationary, such as between brackets 67 which prevent swinging of the pendulum when the rear axle assembly is raised. For example, a sharp turn with the rear axle assembly retracted would not necessarily jeopardize stability of the forklift truck but, without the pendulum being held, could cause the pendulum to swing to a position in which the stabilization jack would be actuated. An alternative would be to provide a limit switch for sensing retraction of the rear axle assembly and disabling operation of the position-sensing valve 62.

The present invention allows the forklift truck to be self-loaded onto a transport vehicle and then contracted to compact condition for travel with the load. At the destination location, the forklift truck can be unloaded conveniently and load and unload freight without an adjacent loading dock being required.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A forklift truck for moving between substantially horizontal surfaces at substantially different levels including a higher horizontal surface at a first level and a lower horizontal surface at a second, lower level with or without a load carried by such track comprising a chassis having a front assembly and a rear assembly, said front assembly including front wheels, means powering said front wheels for fore-and-aft movement of said chassis, a mast, a fork carriage movable along said mast for engagement against the higher horizontal surface during movement of the forklift track between the horizontal surfaces and double-acting power drive means for raising said fork carriage relative to said mast to lift a load and to lower said front wheels from the level of the higher horizontal surface to the level of the lower horizontal surface during movement of the forklift track from the higher horizontal surface to the lower horizontal surface and for lowering said fork carriage relative to said mast to lower the load and to raise said front wheels from the level of the lower horizontal surface to the level of the higher horizontal surface during movement of the forklift track from the lower horizontal surface to the higher horizontal surface, said rear assembly including rear wheels, a rear axle assembly carrying said rear wheels, means for braking said rear wheels, an operator compartment, means mounting said rear axle assembly for vertical movement relative to said operator compartment between a raised normal working position in which said rear axle assembly is positioned close beneath said operator compartment and a downward-projected position in which said rear axle assembly is positioned a substantial distance below said operator compartment and power drive means for moving said rear axle assembly between said raised normal working position and said downward projected position in coordination with raising and lowering of said fork carriage by said double-acting power driving means so as to maintain said operator compartment in approximately horizontal alignment with said front assembly during movement of the forklift truck between the horizontal surfaces, means interconnecting said front assembly and said rear assembly for relative movement toward and away from each other, and power drive means for moving said front assembly and said rear assembly toward and away from each other between an extended normal working condition and a contracted condition for shifting said front assembly along the higher horizontal surface when the rear wheels are braked by the braking means and the fork carriage is in engagement against the higher horizontal surface with the rear axle assembly maintained in its downward projected position, said rear assembly including a landing wheel mounted in front of said rear axle assembly at a location no lower than said rear wheels when said rear axle assembly is in its raised normal working position, said landing wheel being operable to support said rear assembly during movement of the truck from the lower horizontal surface to the higher horizontal surface, and means for automatically braking said landing wheel when said landing wheel reaches a predetermined position on the higher horizontal surface.

2. The truck defined in claim 1, in which the rear assembly includes a position-sensing wheel interconnected with the landing wheel, said landing wheel braking means being actuated by said position-sensing wheel.

3. The truck defined in claim 1, in which the landing wheel braking means includes a support plate carrying the landing wheel, said support plate being swingably mounted beneath the chassis, and a position-sensing member carried by said support plate and controlling braking of the landing wheel.

4. The truck defined in claim 3, in which the support plate is mounted for swinging relative to the chassis about a swinging axis offset from the axis of rotation of the landing wheel, the position-sensing member being carried by the support plate at the side of the swinging axis of the support plate which side is opposite the axis of the landing wheel.

* * * * *

UNITED STATES PATENT AND TRADEMARK OFFICE
CERTIFICATE OF CORRECTION

PATENT NO. : 5,409,346

DATED : April 25, 1995

INVENTOR(S) : Martin Grether

It is certified that error appears in the above-indentified patent and that said Letters Patent is hereby corrected as shown below:

| **COLUMN** | **LINE** | |
|---|---|---|
| Cover Page, Column 2 | After Primary Examiner | After "Primary Examiner" and before "[57]" insert --Attorney, Agent, or Firm--Christensen, O'Connor, Johnson & Kindness-- |
| 7 (Claim 1, | 63 line 5) | "track" should read --truck-- |
| 8 (Claim 1, | 1 line 11) | "track" should read --truck-- |
| 8 (Claim 1, | 7 line 17) | "track" should read --truck-- |
| 8 (Claim 1, | 11 line 22) | "track" should read --truck-- |

Signed and Sealed this

Fifteenth Day of August, 1995

Attest:

Bruce Lehman

BRUCE LEHMAN

*Attesting Officer* *Commissioner of Patents and Trademarks*